US012699343B2

(12) United States Patent
Nagata

(10) Patent No.: US 12,699,343 B2
(45) Date of Patent: Aug. 4, 2026

(54) IMAGE FORMING APPARATUS, AND CONTROL METHOD FOR DISPLAYING A REMAINING AMOUNT OF DEVELOPING AGENT BASED ON A DETECTED VALUE OR A CALCULATED VALUE

(71) Applicant: CANON KABUSHIKI KAISHA, Tokyo (JP)

(72) Inventor: Naohisa Nagata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/043,090

(22) Filed: Jan. 31, 2025

(65) Prior Publication Data

US 2025/0251688 A1 Aug. 7, 2025

(30) Foreign Application Priority Data

Feb. 7, 2024 (JP) ................................ 2024-016990

(51) Int. Cl.
*G03G 15/08* (2006.01)
*G03G 15/00* (2006.01)

(52) U.S. Cl.
CPC .................................. *G03G 15/556* (2013.01)

(58) Field of Classification Search
CPC ........... G03G 15/0855; G03G 15/0862; G03G 15/0889; G03G 15/5016; G03G 15/553; G03G 15/556
See application file for complete search history.

(56) References Cited

U.S. PATENT DOCUMENTS

| | | | | |
|---|---|---|---|---|
| 11,269,266 | B2 * | 3/2022 | Kobayashi ........... | G03G 15/553 |
| 2009/0010659 | A1 * | 1/2009 | Watanabe .......... | G03G 15/0862 399/27 |
| 2023/0161282 | A1 * | 5/2023 | Ogawa ............... | G03G 15/5016 399/53 |

FOREIGN PATENT DOCUMENTS

| | | |
|---|---|---|
| JP | 2001228698 A | 8/2001 |

* cited by examiner

*Primary Examiner* — Hoang X Ngo
(74) *Attorney, Agent, or Firm* — Canon U.S.A., Inc. IP Division

(57) ABSTRACT

An image forming apparatus that performs image formation using a developing agent, the image forming apparatus includes a containing unit that contains the developing agent, a detection unit that detects a remaining amount of the developing agent, a calculation unit that calculates the remaining amount of the developing agent, and a display unit that displays the remaining amount of the developing agent, wherein the display unit, in a case where the remaining amount of the developing agent detected by the detection unit is a predetermined amount or more, displays a value based on the remaining amount calculated by the calculation unit, and in a case where the remaining amount of the developing agent detected by the detection unit is less than the predetermined amount, displays a value based on the remaining amount detected by the detection unit.

14 Claims, 6 Drawing Sheets

IMAGE FORMING APPARATUS, AND CONTROL METHOD FOR DISPLAYING A REMAINING AMOUNT OF DEVELOPING AGENT BASED ON A DETECTED VALUE OR A CALCULATED VALUE

BACKGROUND

Field

The present disclosure relates to an image forming apparatus and a method for controlling the image forming apparatus.

Description of the Related Art

A conventional electrophotographic image forming apparatus, such as a copy machine, a printer, and a facsimile, transfers a developing agent in a developing agent containing unit of the image forming apparatus to a sheet via a photosensitive drum and an intermediate transfer belt (ITB) to form an image. The image forming apparatus then detects the amount of the developing agent remaining in the developing agent containing unit. When the remaining amount is low, the image forming apparatus displays a message on its operation panel, and a user supplies the developing agent to the image forming apparatus from a pack or a bottle containing it.

As methods for detecting an amount of a developing agent remaining in a developing agent containing unit, there are known methods that involve transmitting light through the developing agent containing unit and detecting the transmitted light with a light-receiving unit to determine an amount of the remaining developing agent based on the light blocked by the developing agent. Another method uses an antenna electrode for detecting capacitance of a developing agent to determine an amount of the remaining developing agent. In the former method using an optical sensor, when there is a certain amount or more of the developing agent in the developing agent containing unit, the light is constantly blocked by the developing agent. As a result, detection signals from the light-receiving unit will not change, which makes it impossible to detect changes in the amount of the remaining developing agent. Further, in the latter method using an antenna-system sensor, when the amount of the remaining developing agent falls below a certain level, the capacitance becomes extremely small. As a result, it may be impossible to accurately detect changes in small remaining amounts of the developing agent in the developing agent containing unit.

In Japanese Patent Application Laid-Open No. 2001-228698, in order to sequentially detect amounts of the developing agent remaining in the developing agent containing unit from full to empty, an antenna-system sensor is used to detect amounts of the remaining developing agent in the range from 100% to 50% based on the capacitance. Furthermore, Japanese Patent Application Laid-Open No. 2001-228698 discloses a technique of using an optical sensor that detects amounts of the remaining developing agent in the range of 50% or less based on the amount of light transmitted, resulting in the use of two types of sensors.

SUMMARY

The present disclosure is directed to an image forming apparatus that employs a highly accurate optical sensor, which can detect an amount of a remaining developing agent even when the amount is high after a user supplies the developing agent.

According to an aspect of the present disclosure, an image forming apparatus that performs image formation using a developing agent, the image forming apparatus includes a containing unit configured to contain the developing agent, a detection unit that detects a remaining amount of the developing agent, a calculation unit that calculates the remaining amount of the developing agent based on a pixel count of a formed image, and a display unit that displays the remaining amount of the developing agent, wherein the containing unit includes, a supply port that supplies the developing agent without being removed from the image forming apparatus, and a stirring unit that stirs the developing agent in the containing unit, wherein the detection unit detects the remaining amount of the developing agent after the developing agent is stirred by the stirring unit, and wherein the display unit, in a case where the remaining amount of the developing agent detected by the detection unit is a predetermined amount or more, displays a value based on the remaining amount calculated by the calculation unit, and in a case where the remaining amount of the developing agent detected by the detection unit is less than the predetermined amount, displays a value based on the remaining amount detected by the detection unit.

Further features of the present disclosure will become apparent from the following description of exemplary embodiments with reference to the attached drawings.

DESCRIPTION OF THE EMBODIMENTS

Details of an exemplary embodiment of the present disclosure will now be described in an exemplified manner with reference to the accompanying drawings. However, the constituent elements described in the present exemplary embodiment are merely examples, and are not intended to limit the scope of the present disclosure.

Figure 1:
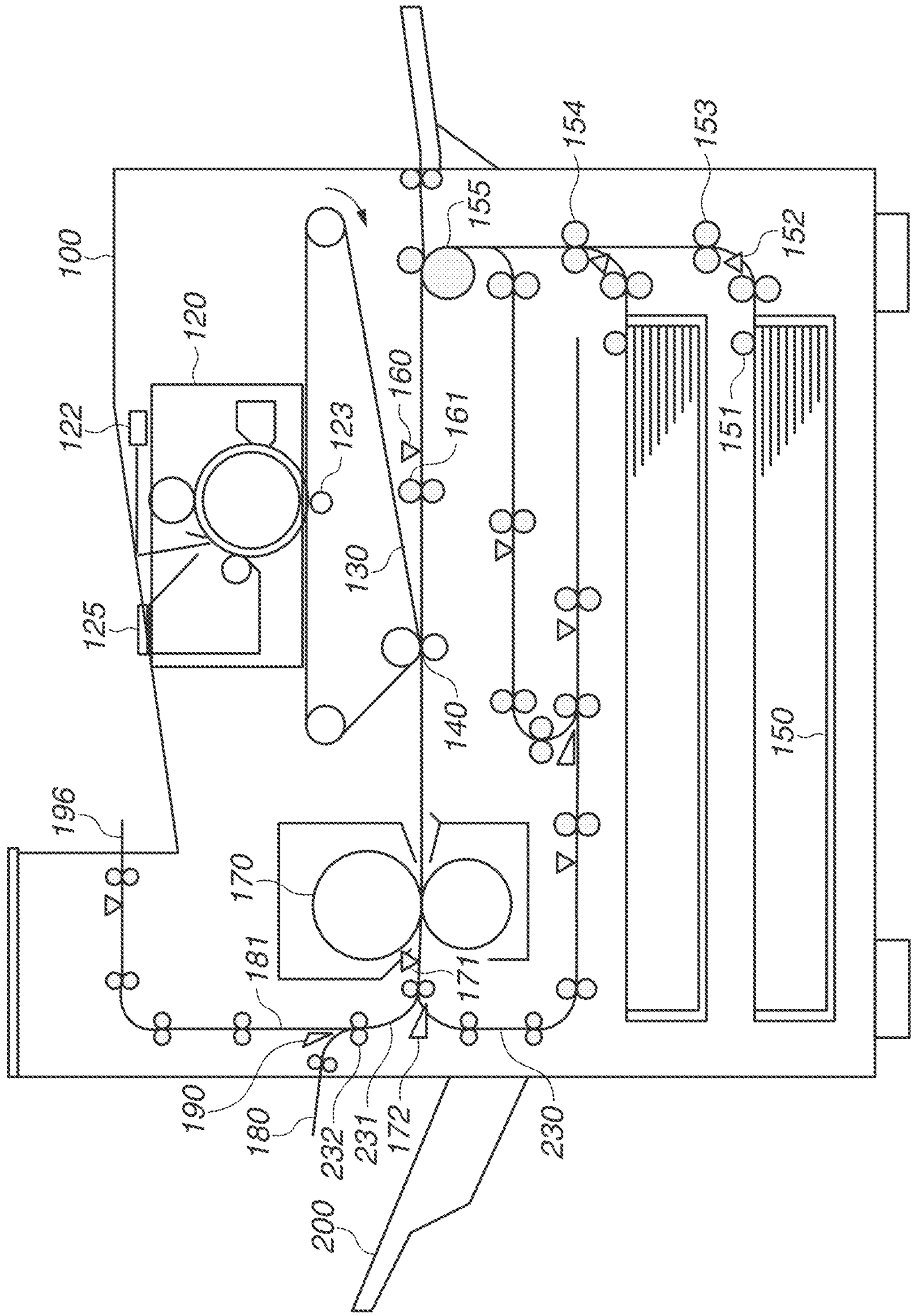
FIG. 1 is the cross-sectional view of an image forming apparatus according to an exemplary embodiment of the present disclosure.
Figure 2A:
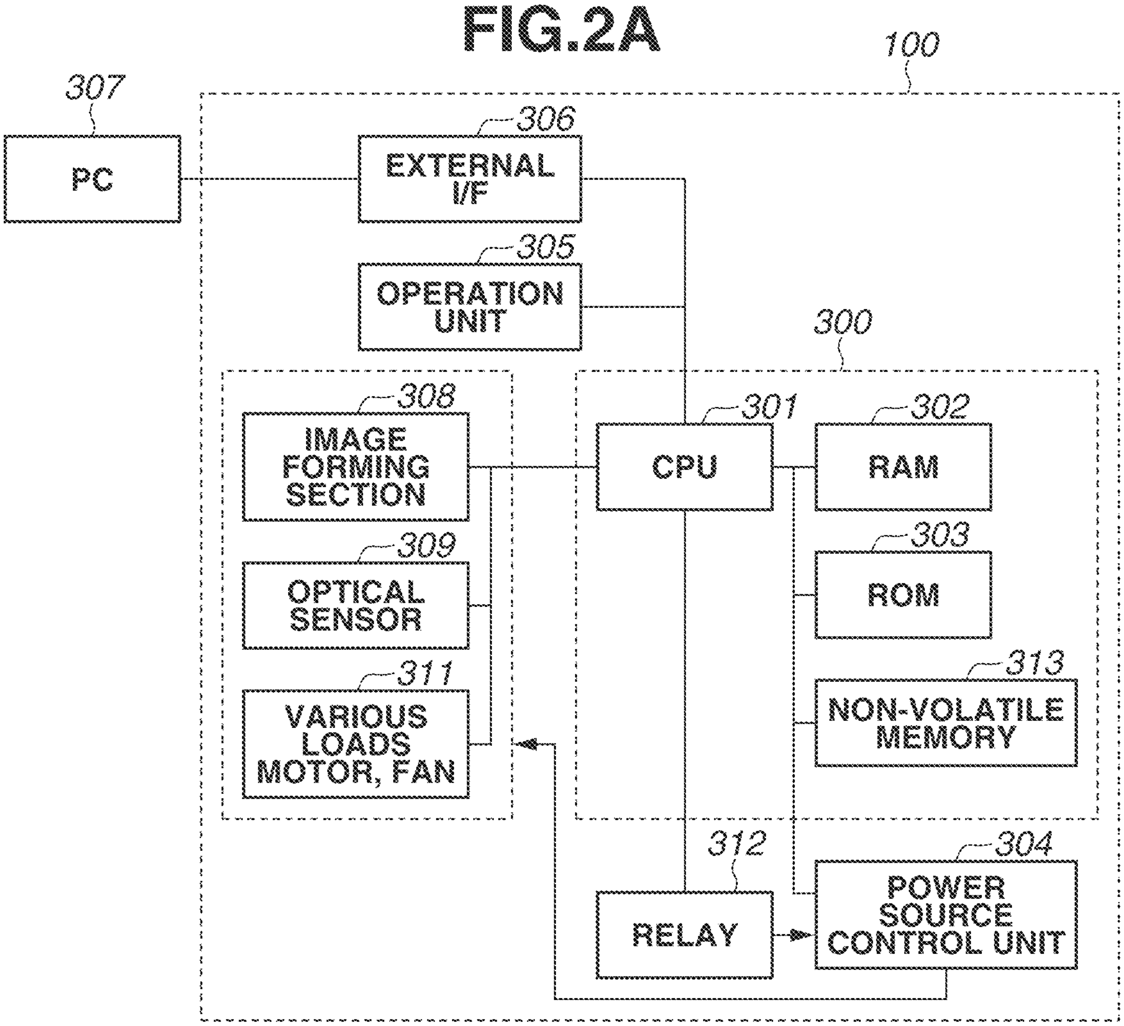
FIGS. 2A and 2B are control block diagrams illustrating the exemplary embodiment of the present disclosure.

FIG. 1 is the cross-sectional view of a monochrome image forming apparatus 100 (hereinafter referred to as the image forming apparatus 100) illustrating the present exemplary embodiment. FIG. 2A is a diagram illustrating an example of a hardware configuration according to the present exemplary embodiment. A basic configuration will be described with reference to FIGS. 1 and 2A. While the monochrome image forming apparatus will be described as an example in the present exemplary embodiment, the image forming apparatus in the present disclosure can be a full-color image forming apparatus.

A control unit 300 in FIG. 2A includes a central processing unit (CPU) 301, a random-access memory (RAM) 302, a read-only memory (ROM) 303, and a non-volatile memory 313. The CPU 301 is connected to a power source control unit 304, which controls the supply of power used for operating the image forming apparatus 100.

An operation unit 305 includes a touch panel (hereinafter referred to as an operation unit) connected to the CPU 301, allowing a user to request the CPU 301 with the operation unit 305 for desired operations, such as a print job execution and a power-on/off operation. The CPU 301 is connected to a personal computer (PC) 307 via an external interface (I/F) 306, which is an interface with an external device. In response to an instruction for the start of a print operation from the operation unit 305 or the PC 307, the CPU 301 starts the operation regarding the printing.

Additionally, the CPU 301 is connected to an optical sensor 309 for performing detection processing for an amount of remaining toner, which will be described below, and various loads 311 for driving motors and fans in the image forming apparatus 100.

For example, when the user instructs the start of the print operation on the PC 307, the CPU 301 performs drive control of an image forming section 308 and the various loads 311 including the connected motors and fans.

The image forming section 308 includes an image forming unit 120, an intermediate transfer belt 130, a primary transfer unit 123, and a secondary transfer unit 140, which are illustrated in FIG. 1. The CPU 301 is capable of applying high voltages to and performing drive control of the image forming unit 120, the intermediate transfer belt 130, the primary transfer unit 123, and the secondary transfer unit 140, and controlling a laser scanner 122.

Programs for executing processing regarding image formation and processing illustrated in a flowchart are stored in the ROM 303. The flowchart will be described below.

The non-volatile memory 313 is a storage medium capable of storing data even after the power supply to the CPU 301 is stopped. Among data stored in the RAM 302, data continuously used even after power-off/on is stored in the non-volatile memory 313.

The image forming section 308, the optical sensor 309, and the various loads 311 are connected to the power source control unit 304 and supplied with power used for operations. Depending on the power source system to be used, the CPU 301 is capable of controlling the driving of a relay 312 connected to the CPU 301 to switch the power supply on and off.

A basic image forming operation will be described with reference to FIGS. 1 and 2A.

Suppose the user instructs the execution of a print job with the PC 307 connected to an external I/F 306. The PC 307 notifies the CPU 301 in the image forming apparatus 100 of the instruction for a start of the print operation. The CPU 301 starts a paper feed operation from a paper feed cassette 150, for example.

The CPU 301 drives a conveying motor serving as the driving source for a paper pickup roller 151, which causes the paper pickup roller 151 to perform a rotational operation, and thus, sheets in the paper feed cassette 150 are fed and conveyed one by one. At this time, the CPU 301 monitors with a paper feed pickup sensor 152 whether the paper feed operation is normally performed.

Meanwhile, the CPU 301 allows the image forming unit 120 to start the image forming operation in time for the arrival of a sheet at the secondary transfer unit 140. The image forming unit 120 is fixed in the image forming apparatus 100, and enables the supply of toner from a supply port 125.

Figure 3:
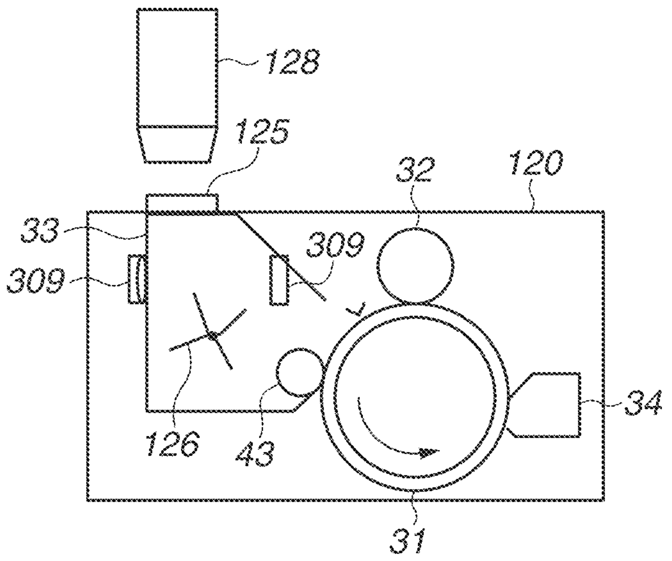
FIG. 3 is the configuration diagram of an image forming unit in the image forming apparatus.

FIG. 3 is a diagram illustrating a configuration of the image forming unit 120. The image forming unit 120 includes a photosensitive body 31, a charging roller 32, a developing device 33 including a developing roller 43, and a photosensitive body cleaner 34.

The photosensitive body 31 and the charging roller 32 are driven by a driving source. The developing roller 43 and the photosensitive body 31 are separately driven. The image forming apparatus 100 is configured to stop the developing roller 43 alone independently of the photosensitive body 31. A toner stirring screw 126 stirs toner in the developing device 33 with the driving source identical to that of the developing roller 43.

In the image forming apparatus 100 described in the present exemplary embodiment, instead of the replacement of a toner cartridge as a toner container, toner is supplied from a toner pack. In the present exemplary embodiment, a toner pack 128 that contains toner is attached to the supply port 125, and the toner is supplied from the toner pack 128 to the developing device 33. The developing device 33 contains toner as a toner tank, and supplies the toner to the developing roller 43.

After the surface of the photosensitive body 31 is charged by the charging roller 32, a latent image is formed on the photosensitive body 31 with laser beams emitted from the laser scanner 122 illustrated in FIG. 1. The formed latent image is then developed on the photosensitive body 31 by the developing roller 43 with the toner in the developing device 33. Thereafter, a primary transfer voltage is applied to the toner image developed on the photosensitive body 31 in the primary transfer unit 123 illustrated in FIG. 1, and the toner image is transferred to the intermediate transfer belt 130 illustrated in FIG. 1. The toner image transferred to the intermediate transfer belt 130 reaches the secondary transfer unit 140 by rotation of the intermediate transfer belt 130.

The optical sensor 309 in FIG. 2A includes a light-emitting unit 309*a* and a light-receiving unit 309*b*.

The amount of remaining toner is determined based on a detection result from the optical sensor 309 and a predicted value of the amount of remaining toner, which is a value obtained by conversion of the integrated value of a pixel count into an amount of toner consumption. A pixel count refers to the number of pixels in an image. A specific method for determining the amount of remaining toner will be described below.

Returning to FIG. 1, the description will continue.

In the paper feed operation, a sheet fed from the paper feed cassette 150 is conveyed downstream of the image forming apparatus 100 by conveyance path rollers 153, 154, and 155. The CPU 301 monitors a pre-registration conveyance sensor 160 to locate the conveyed sheet. In consideration of the timing at which the leading end of a sheet reaches the pre-registration conveyance sensor 160, the CPU 301 controls the conveyance of the sheet so that the leading ends of the sheet and the toner image on the intermediate transfer belt 130 are aligned with each other at the secondary transfer unit 140. For example, when determining the arrival of a sheet earlier than the toner image, the CPU 301 stops the sheet with a registration roller 161 for a predetermined period of time, and then resumes the conveyance to align the leading ends with each other.

As described above, a secondary transfer voltage is applied to the sheet and the toner image conveyed at the secondary transfer unit 140, and thus, the toner image is transferred to the sheet.

The sheet after the secondary transfer is conveyed to a fixing device 170. After the toner image on the sheet is heated and fixed thereto by the fixing device 170, the sheet is conveyed further downstream of the image forming apparatus 100.

When the leading end of the sheet after the fixing reaches a paper conveyance sensor 171, the CPU 301 determines which paper conveyance path will be taken, a paper conveyance path 230 or a paper conveyance path 231 for the sheet to be conveyed based on an instruction preliminarily designated from the operation unit 305 or the PC 307 connected to the image forming apparatus 100 via the external I/F 306. At this time, the CPU 301 switches the operation of a conveyance flapper 172 based on the determination to switch the destination to which the sheet is to be conveyed. Specifically, in a double-sided print instruction, the sheet is conveyed to the paper conveyance path 230. In a one-sided printing or printing on the back of a sheet in double-sided printing, the sheet is conveyed to the paper conveyance path 231.

The following is a description of a case where the sheet is conveyed to the paper conveyance path 231.

The sheet conveyed on the paper conveyance path 231 is conveyed further downstream of the image forming apparatus 100 by a conveyance path roller 232. Similarly to the above-described switching, the CPU 301 switches the operation of a paper conveyance flapper 190 based on an instruction preliminarily designated from the operation unit 305 or the PC 307 connected to the image forming apparatus 100 via the external I/F 306. This configuration can switch the conveyance of a sheet to a paper conveyance path 180 or to a paper conveyance path 181. When the sheet discharge destination designated by the user is a paper discharge tray 200, the sheet is conveyed to the paper conveyance path 180. When the paper discharge destination is a paper discharge tray 196, the sheet is conveyed to the paper conveyance path 181.

The above-described basic operation of image forming is merely an example, and the present disclosure is not limited to the above-described configuration.

<Description About Method for Detecting Amount of Remaining Toner>

Figure 2B:
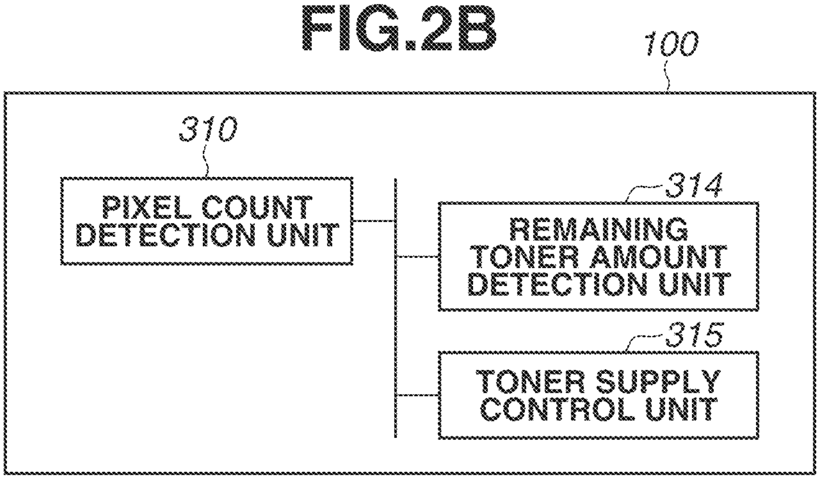

A method for detecting an amount of toner remaining in the developing device 33 will now be described with reference to FIGS. 2B and 3. FIG. 2B is a diagram illustrating an example of a software configuration of the image forming apparatus 100. The functions of software blocks are implemented by the execution of programs stored in the ROM 303 by the CPU 301. In the present exemplary embodiment, a pixel count detection unit 310, a remaining toner amount detection unit 314, a toner supply control unit 315 are described as the software blocks, but can be implemented by hardware, such as an Application-Specific Integrated Circuit (ASIC).

The rotational driving of the toner stirring screw 126 stirs the toner in the developing device 33.

The remaining toner amount detection unit 314 illustrated in FIG. 2B turns on a light-emitting diode (LED) in the light-emitting unit 309*a* of the optical sensor 309 in this state, and then, detects a remaining toner amount signal with the light-receiving unit 309*b*. Remaining toner amount signals indicate high when the light is blocked by toner, and low when the light is transmitted. The remaining toner amount detection unit 314 performs sampling by acquiring signal values a predetermined number of times at predetermined sampling intervals and detects high or low patterns in the sampled remaining toner amount signals, which determines the amount of the remaining toner in units of percentage. However, when the amount of the remaining toner is large, sampled values of remaining toner amount signals are constantly high indicating that the light is blocked by toner. This makes it impossible to determine the actual amounts of remaining toner. With this configuration, due to the attachment position and detection accuracy of the optical sensor 309, it is impossible to determine actual amounts of remaining toner when the amount of remaining toner indicates 60% or more, and it is possible to detect actual amounts of remaining toner as percentages when the amount of remaining toner indicates below 60%. In the present exemplary embodiment, when the amount of remaining toner in the developing device 33 is 60% or more, the output from the optical sensor 309 indicates 60%. However, even when the amount of remaining toner in the developing device 33 is 60% or more, the amount of remaining toner detected by the optical sensor 309 can be notified to the remaining toner amount detection unit 314. In the present exemplary embodiment, a case is described where it is impossible to detect remaining amounts as percentages when the remaining amount is 60% or more as an example, but a remaining amount corresponding to a threshold is not limited to the above-described value.

In the present exemplary embodiment, when the amount of remaining toner is 60% or more, the pixel count of a printed image is used to determine the actual amount of remaining toner. The pixel count detection unit 310 in FIG. 2B processes an image information input from the PC 307 via the external I/F 306. The pixel count detection unit 310 detects a pixel count (i.e., the number of pixels forming the image) emitted by the laser scanner 122 in accordance with the timings of an image formation, integrates the detected pixel count, and stores the integrated value in the non-volatile memory 313. An amount of toner consumption can be predicted from the integrated value of the pixel count. The remaining toner amount detection unit 314 reads the integrated value of the pixel count from the non-volatile memory 313 and converts the integrated value into an amount of toner consumption.

When detection signal values from the optical sensor 309 are constantly high immediately after the user supplies toner, in other words, when it is impossible to determine the actual amounts of remaining toner since the amount of remaining toner is 60% or more, the remaining toner amount detection unit 314 temporarily assumes the amount of remaining toner to be 100%. The remaining toner amount detection unit 314 then subtracts, from the amount of remaining toner stored in the image forming apparatus 100, the amount of toner consumption obtained from the integrated value of the pixel count to determine a predicted value of the amount of remaining toner. When the predicted value of the amount of remaining toner obtained from the pixel count indicates below 60%, the amount of remaining toner is fixed at 60% until a detection result from the optical sensor 309 falls below 60%. Thereafter, when the detection result from the optical sensor 309 indicates below 60%, the remaining toner amount detection unit 314 uses the amount of remaining toner determined based on the detection result from the optical sensor 309.

When the toner is supplied, the toner supply control unit 315 detects the amount of remaining toner after the supply is provided, and performs processing for displaying the amount of remaining toner on the operation unit 305. The processing performed by the toner supply control unit 315 will be described below with reference to FIG. 5.

<Description About Method for Detecting Amount of Remaining Toner at Time of Toner Supply>

In the present exemplary embodiment, an operation of the image forming apparatus 100 will be described with reference to a flowchart.

Figure 5:
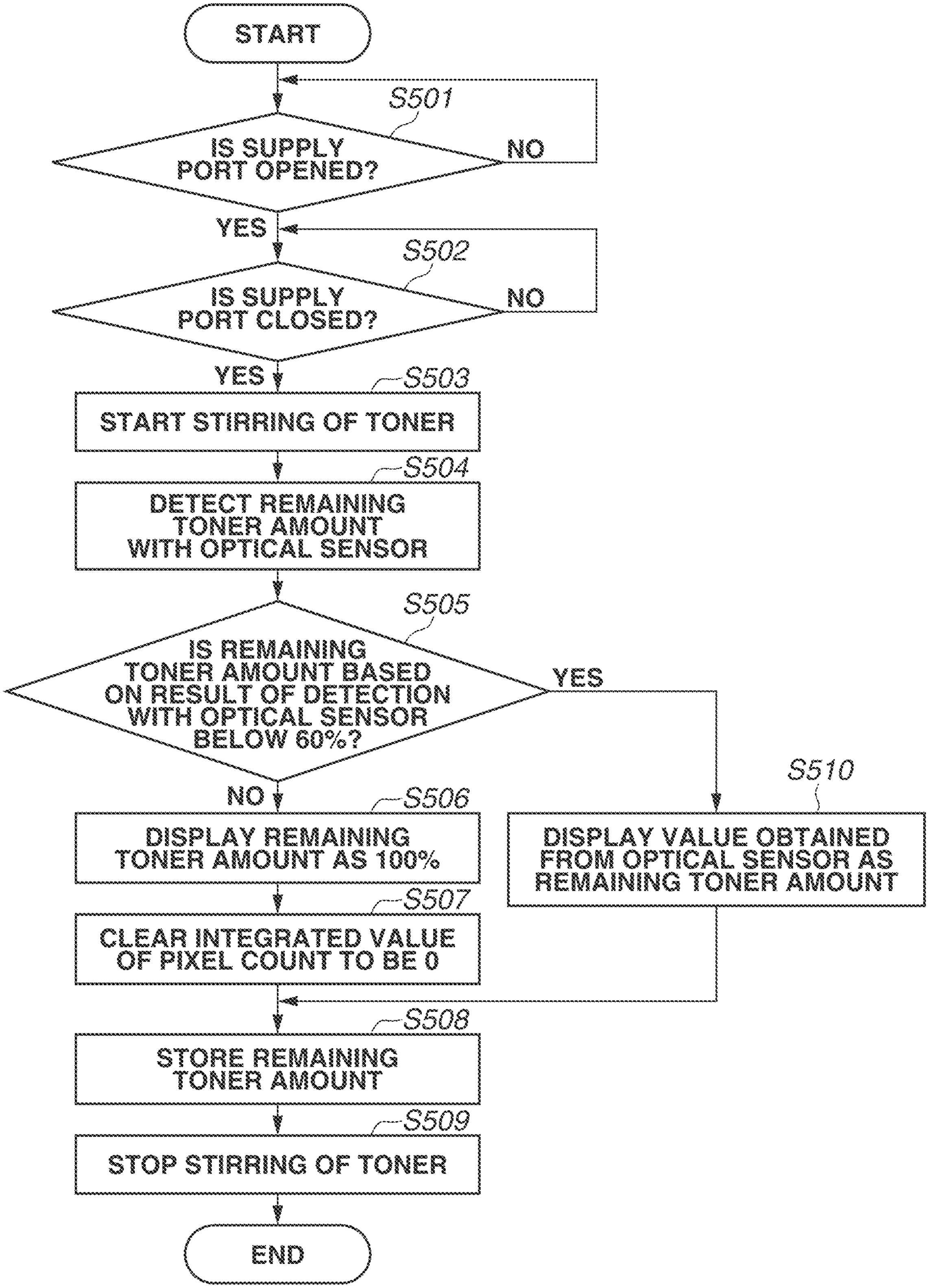
FIG. 5 is a flowchart illustrating processing at the time of a toner supply.

FIG. 5 is a flowchart illustrating processing of the image forming apparatus 100 when the user supplies toner from the toner pack 128. The flowchart in FIG. 5 is executed by the toner supply control unit 315 illustrated in FIG. 2B. Programs for executing the processing illustrated in FIG. 5 is stored in the ROM 303 and read to be executed by the CPU 301.

In FIG. 3, when the user attaches the toner pack 128 to the supply port 125 and operates a not-illustrated supply lever to open the supply port 125, the toner in the toner pack 128 is supplied to the developing device (the developing agent containing unit) 33 under its own weight. When the supply is ended, the user operates the supply lever to close the supply port 125 and removes the toner pack 128 from the supply port 125.

In step S501, the CPU 301 determines whether the supply port 125 is opened for a toner supply. An opened/closed state of the supply port 125 can be detected with the hardware configuration based on the high/low state of an input port signal. If the CPU 301 determines whether the supply port 125 is opened (YES in step S501), the processing proceeds to step S502.

In step S502, the CPU 301 determines whether the supply port 125 is closed after the toner supply by the user is completed. If the CPU 301 detects a state where the supply port 125 is closed (YES in step S502), the processing proceeds to step S503.

In step S503, the CPU 301 drives a motor that serves as the driving source of the toner stirring screw 126 to start stirring of toner.

The processing proceeds to step S504. In step S504, the CPU 301 detects the amount of the remaining toner using the optical sensor 309 by the above-described method. At this time, when the amount of the remaining toner contained in the developing device 33 is 60% or more, detection values from the light-receiving unit 309*b* of the optical sensor 309 are constantly high indicating that the light is blocked by the toner. This makes it impossible to detect the amount of the remaining toner.

In step S505, the CPU 301 determines whether the amount of the remaining toner based on the detection result from the optical sensor 309 is below 60%.

Figure 6A:
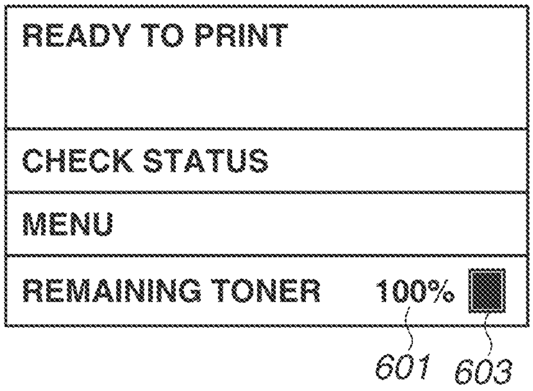
FIGS. 6A and 6B each illustrates an example of the display of an amount of remaining toner.

If the amount of the remaining toner is not below 60% (NO in step S505), the CPU 301 executes processing described in step S506. Since the actual amount of the remaining toner is not determined, the CPU 301 assumes the amount of the remaining toner to be 100% and displays the amount on the operation unit 305. FIG. 6A illustrates an example of the screen displayed on the operation unit 305 in step S506. A remaining toner amount 601 indicates a current amount of remaining toner as a percentage. An object 603 indicates the amount of remaining toner filled with a specific color according to the displayed remaining toner level. In FIG. 6A, since the amount of remaining toner is at 100%, the object 603 is entirely filled with the specific color.

Subsequently, the CPU 301 executes processing described in step S507. The CPU 301 clears the integrated value of the pixel count stored in the non-volatile memory 313 to be 0. Thereafter, in step S508, the CPU 301 stores the amount of the remaining toner as 100% in the non-volatile memory 313.

Figure 6B:
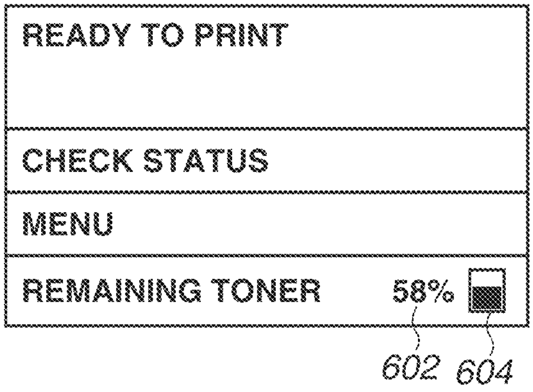

In step S505, the CPU 301 determines whether the amount of the remaining toner based on the detection result from the optical sensor 309 indicates below 60%. If the amount of the remaining toner is below 60% (YES in step S505), the CPU 301 executes processing described in step S510. In step S510, the CPU 301 displays the amount of the remaining toner on the operation unit 305 based on the detection result from the optical sensor 309. FIG. 6B illustrates an example of the screen displayed on the operation unit 305 when the amount of the remaining toner detected by the optical sensor 309 is 58%. A remaining toner amount 602 indicates a current amount of remaining toner as a percentage. An object 604 indicates the amount of remaining toner. The object 604 is filled with a specific color according to the detected remaining toner level. A case where the remaining amount is displayed in increments of one percent is described in the present exemplary embodiment, but the remaining amount can be displayed in increments of a predetermined percentage. For example, the amount of remaining toner can be displayed as 60% when the actual amount of remaining toner falls within 50% to 60%.

In step S508, the CPU 301 stores an amount of remaining toner of 58% as a value in the non-volatile memory 313. In step S509, the CPU 301 stops the motor that serves as the driving source of the toner stirring screw 126. The processing executed when toner is supplied is completed.

<Description About Method for Detecting Remaining Toner Amount at Time of Printing>

Figure 4:
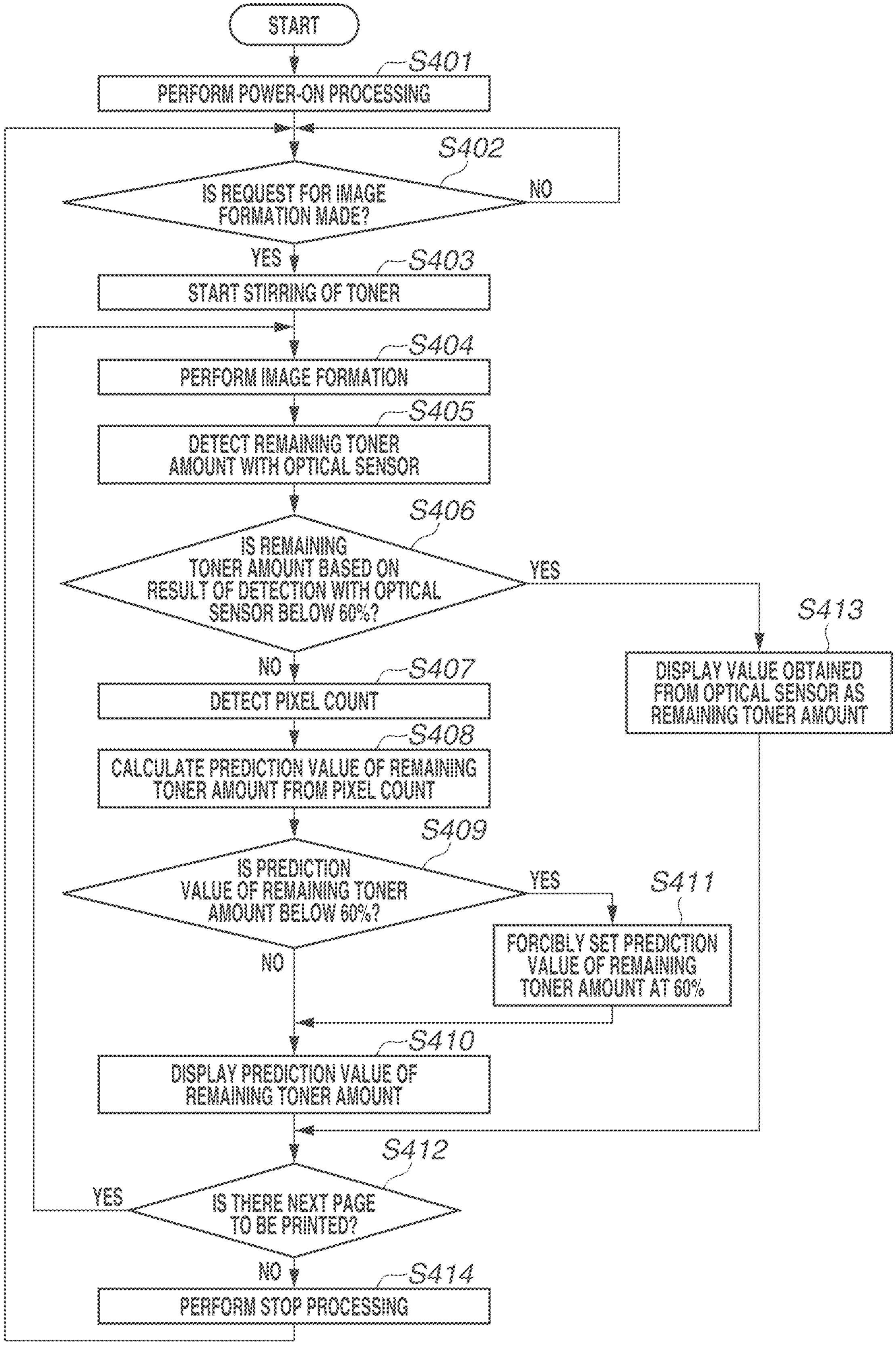
FIG. 4 is a flowchart illustrating processing of determining an amount of remaining toner at the time of a printing.

FIG. 4 is a flowchart illustrating processing of the image forming apparatus 100 to detect the amount of remaining toner at the time of printing.

Programs for executing the flowchart illustrated in FIG. 4 are stored in the ROM 303, and the CPU reads and executes the programs to perform the processing.

The processing illustrated in FIG. 4 is performed by energization of the CPU 301.

In step S401, the CPU 301 executes power-on processing to start power supply to the image forming apparatus 100. When the power-on is completed, the CPU 301 executes processing described in step S402.

In step S402, the CPU 301 determines whether a request for image formation is made.

Requests for image formation include a print instruction from the PC 307 and an instruction of starting a copy job via the operation unit 305. If a request for an image formation is determined (YES in step S402), the CPU 301 executes processing described in step S403.

In step S403, the CPU 301 drives the motor that serves as the driving source of the toner stirring screw 126 to start stirring of toner.

In step S404, the CPU 301 controls the image forming section 308 and the various loads 311 to perform an image formation. When the image formation corresponding to one page is completed, the CPU 301 executes processing described in step S405.

In step S405, the CPU 301 operates the optical sensor 309 using the above-described method to detect an amount of remaining toner. The CPU 301 acquires the output from the optical sensor 309 and determines the amount of remaining toner based on the acquired output. At this time, when the amount of the remaining toner contained in the developing device 33 is 60% or more, detection values from the light-receiving unit 309*b* of the optical sensor 309 are constantly high indicating that the light is blocked by the toner. This makes it impossible to determine the actual amount of the remaining toner.

In step S406, the CPU 301 determines whether the amount of the remaining toner based on the detection result from the optical sensor 309 is below 60%. If the amount of the remaining toner is not below 60% (NO in step S406), the CPU 301 executes processing described in step S407.

In step S407, the CPU 301 detects the pixel count of the image corresponding to one page when the image formation is performed, adds the pixel count to the integrated value of the pixel count read from the non-volatile memory 313, and stores the result value in the non-volatile memory 313.

In step S408, the CPU 301 uses a value obtained by converting the added integrated value of the pixel count into an amount of toner consumption to calculate the amount of remaining toner (%). The following is a more specific description of the method. The CPU 301 calculates the product of the added integrated value of the pixel count and the amount of toner consumed per pixel (%). The CPU 301 subtracts the obtained amount of remaining toner from the amount stored in the non-volatile memory 313 to calculate a predicted value of the amount of remaining toner.

Subsequently, in step S409, the CPU 301 determines whether the predicted value of the amount of the remaining toner calculated in step S408 is below 60%. If the amount of the remaining toner is 60% or more (NO in step S409), the CPU 301 executes processing described in step S410. In step S410, the CPU 301 displays the calculated predicted value of the amount of the remaining toner on the operation unit 305.

On the other hand, if the predicted value of the amount of remaining toner calculated from the integrated value of the pixel count is below 60% (YES in step S409), the CPU 301 executes processing described in step S411.

Detection results of the amount of remaining toner vary depending on use environments, such as temperature and humidity, and tolerances of the attachment position of the optical sensor 309. Thus, there is a case where a detection result from the optical sensor 309 does not indicate below 60% even when an original predicted value of the amount of remaining toner is below 60%. In the present exemplary embodiment, when the amount of remaining toner calculated using the pixel count is below 60%, the actual amount of remaining toner obtained based on the pixel count is not displayed, and the amount of remaining toner is displayed as a constant value of 60%.

In step S411, the CPU 301 sets the stored amount of remaining toner at 60%. Thus, when the CPU 301 executes processing in step S410 after the processing in step S411 is performed, the amount of the remaining toner displayed on the operation unit 305 is 60%. Thereafter, the CPU 301 executes processing described in step S412.

In step S412, the CPU 301 determines whether the next page to be printed exits.

If the amount of the remaining toner determined based on the detection result from the optical sensor 309 is below 60% (YES in step S406), the CPU 301 executes processing described in step S413.

In step S413, the CPU 301 causes the operation unit 305 to display the amount of the remaining toner determined based on the detection result from the optical sensor 309. Thereafter, the CPU 301 executes processing described in step S412.

If the next page to be printed exists (YES in step S412), the processing returns to step S404. On the other hand, if no next page to be printed exists (NO in step S412), the processing proceeds to step S414.

In step S414, the CPU 301 performs processing of stopping the application of a high voltage and the driving of the motor, and ends the printing operation. The processing then proceeds to step S402 again.

The processing described in FIG. 4 is executed until the image forming apparatus 100 is powered off.

As illustrated in FIG. 4, when the amount of remaining toner is more than a predetermined value, the amount of remaining toner is calculated based on the pixel count of a printed image in the present exemplary embodiment. In this manner, it is possible to display on the operation unit how much toner is used even when the amount of remaining toner is undetectable by a sensor, such as the optical sensor. Additionally, in the present exemplary embodiment, when the actual amount of remaining toner is less than or equal to a predetermined value, the amount of remaining toner determined based on an output from the sensor, such as the optical sensor, is displayed on the operation unit.

This configuration allows the operation unit to display an accurate amount of remaining toner compared to using the pixel count when the actual amount of remaining toner is less than or equal to a predetermined value.

As described above, according to the present exemplary embodiment, even when the remaining amount is in a range in which the amount of remaining toner is undetectable by the optical sensor after toner is supplied, the amount of remaining toner is predicted and displayed based on the pixel count at the time of an image formation. Furthermore, when the predicted value falls below an upper limit value of the remaining amount detectable by the optical sensor, the predicted value is fixed at the upper limit value and displayed, and then the amount of remaining toner is displayed based on the detection result from the optical sensor after the amount of remaining toner becomes a value detectable by the optical sensor.

This makes it possible to display the remaining amount at multiple levels even when the amount of remaining toner is in the range in which the amount of remaining toner is undetectable by the optical sensor after toner is supplied.

In the present exemplary embodiment, the description has been given of a monochrome image forming apparatus including one image forming unit 120 as an exemplary embodiment for simplifying the description, but a full-color image forming apparatus including a plurality of image forming units can also perform similar processing.

Additionally, the description has been given of an electrophotographic image forming apparatus that uses toner as a developing agent, but an ink-jet image forming apparatus that uses ink as a developing agent can also perform similar processing.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-016990, filed Feb. 7, 2024, which is hereby incorporated by reference herein in its entirety.

What is claimed is:

1. An image forming apparatus configured to perform image formation using a developing agent, the image forming apparatus comprising:

a containing unit configured to contain the developing agent;

at least one processor operating to detect a remaining amount of the developing agent and to calculate the remaining amount of the developing agent based on a pixel count of a formed image; and a display unit configured to display the remaining amount of the developing agent, wherein the containing unit includes:

a supply port configured to supply the developing agent without being removed from the image forming apparatus; and a stirring unit configured to stir the developing agent in the containing unit, wherein a detection unit is configured to detect the remaining amount of the developing agent after the developing agent is stirred by the stirring unit, and wherein the display unit is configured to:

in a case where the remaining amount of the developing agent detected by the detection unit is a predetermined amount or more, display a value based on the remaining amount calculated by the calculation unit; and in a case where the remaining amount of the developing agent detected by the detection unit is less than the predetermined amount, display a value based on the remaining amount detected by the detection unit.

2. The image forming apparatus according to claim 1, wherein the detection unit is further configured to detect the remaining amount of the developing agent based on an output from an optical sensor.

3. The image forming apparatus according to claim 1, wherein, the display unit is further configured to, in a case where the remaining amount of the developing agent detected by the detection unit is the predetermined amount or more and the remaining amount of the developing agent calculated by the calculation unit is less than the predetermined amount, display a value based on the predetermined amount.

4. The image forming apparatus according to claim 1, wherein the detection unit is further configured to detect the remaining amount of the developing agent in response to a completion of supplying the developing agent.

5. The image forming apparatus according to claim 4, wherein the display unit is further configured to, in a case where the remaining amount of developing agent detected in response to the completion of supplying the developing agent is more than the predetermined amount, display a value based on another predetermined remaining amount.

6. The image forming apparatus according to claim 5, wherein the calculation unit is further configured to subtract the amount of the developing agent calculated based on the pixel count from the another predetermined remaining amount to calculate a value as the remaining amount of the developing agent.

7. The image forming apparatus according to claim 5, wherein the display unit is further configured to, in a case where the remaining amount of the developing agent detected in response to the completion of supplying the developing agent is less than the predetermined amount, display a value based on the remaining amount of the developing agent detected by the detection unit.

8. A method of controlling an image forming apparatus configured to perform image formation using developing agent contained in a containing unit, the method comprising:

detecting a remaining amount of the developing agent;

calculating the remaining amount of the developing agent based on a pixel count of a formed image; and displaying the remaining amount of the developing agent, wherein the containing unit includes:

a supply port configured to supply the developing agent without being removed from the image forming apparatus; and a stirring unit configured to stir the developing agent in the containing unit, wherein the detecting includes detecting the remaining amount of the developing agent after the developing agent is stirred by the stirring unit, and wherein the displaying includes:

in a case where the remaining amount of the developing agent detected in the detecting is a predetermined amount or more, displaying a value based on the remaining amount calculated in the calculating; and in a case where the remaining amount of the developing agent detected in the detecting is less than the predetermined amount, displaying a value based on the remaining amount detected in the detecting.

9. The method of controlling the image forming apparatus according to claim 8, wherein the detecting further includes detecting the remaining amount of the developing agent based on an output from an optical sensor.

10. The method of controlling the image forming apparatus according to claim 8, wherein the further displaying includes, in a case where the remaining amount of the developing agent detected in the detecting is the predetermined amount or more and the remaining amount of the developing agent calculated in the calculating is less than the predetermined amount, displaying a value based on the predetermined amount.

11. The method of controlling the image forming apparatus according to claim 8, wherein the detecting further includes detecting the remaining amount of the developing agent in response to a completion of supplying the developing agent.

12. The method of controlling the image forming apparatus according to claim 11, wherein the displaying further includes, in a case where the remaining amount of the developing agent detected in the detecting, the detecting being executed in response to the completion of supplying the developing agent, is more than the predetermined amount, displaying a value based on another predetermined remaining amount.

13. The method of controlling the image forming apparatus according to claim 12, wherein the calculating further includes subtracting the amount of the developing agent calculated based on the pixel count from the other predetermined remaining amount to calculate a value as the remaining amount of the developing agent.

14. The method of controlling the image forming apparatus according to claim 12, wherein the displaying further includes, in a case where the remaining amount of the developing agent detected in the detecting, the detecting being executed in response to the completion of supplying the developing agent, is less than the predetermined amount, displaying a value based on the remaining amount of the developing agent detected in the detecting.

* * * * *